(12) United States Patent
Bauch et al.

(10) Patent No.: US 9,540,196 B2
(45) Date of Patent: Jan. 10, 2017

(54) DEVICE FOR HANDLING WORKPIECES, IN PARTICULAR PROCESSING PRODUCTS OF A CUTTING METAL SHEET PROCESSING OPERATION, AND MECHANICAL ARRANGEMENTS HAVING SUCH A DEVICE

(71) Applicant: TRUMPF Sachsen GmbH, Neukirch (DE)

(72) Inventors: Heiko Bauch, Bautzen (DE); Christoph Protze, Singwitz (DE)

(73) Assignee: TRUMPF Sachsen GmbH, Neukirch (DE)

( * ) Notice: Subject to any disclaimer, the term of this patent is extended or adjusted under 35 U.S.C. 154(b) by 546 days.

(21) Appl. No.: 14/057,619

(22) Filed: Oct. 18, 2013

(65) Prior Publication Data

US 2014/0112744 A1 Apr. 24, 2014

(30) Foreign Application Priority Data

Oct. 19, 2012 (DE) .................. 10 2012 219 127

(51) Int. Cl.
*B25J 15/02* (2006.01)
*B65H 5/14* (2006.01)
(Continued)

(52) U.S. Cl.
CPC ............... *B65H 5/14* (2013.01); *B21D 43/06* (2013.01); *B21D 43/10* (2013.01);
(Continued)

(58) Field of Classification Search
CPC ..... B21D 43/00; B21D 43/003; B21D 43/006; B21D 43/04; B21D 43/105; B21D 43/11; B23Q 1/585; B23Q 1/603; B23Q 7/04; B23Q 7/043; B25J 15/0028; B25J 15/0226; B25J 18/025
(Continued)

(56) References Cited

U.S. PATENT DOCUMENTS 7,891,227 B2 * 2/2011 Moeck ................. B21D 43/006
294/115
7,988,400 B2 * 8/2011 Yuyama ............... B25J 15/0226
221/265

FOREIGN PATENT DOCUMENTS

DE 3704939 A1 * 8/1988 ............. B23Q 7/043
DE 20110627 U1 2/2002
(Continued)

*Primary Examiner* — Michael McCullough
*Assistant Examiner* — Brendan Tighe
(74) *Attorney, Agent, or Firm* — Fish & Richardson P.C.

(57) ABSTRACT

Devices and methods for handling workpieces, in particular workpieces in the form of processing products of a metal sheet processing operation, are described. The devices include one or more retention members that are movably supported by a retention member bearing and a transverse guide device. If the transverse guide device is moved relative to the retention member along a lifting axis out of a non-operative lifting position into an operative lifting position or out of an operative lifting position into a non-operative lifting position on a fixed retention member bearing, the retention member is thereby moved from a non-operative position into an operative position or out of an operative position into a non-operative position. In the operative position, the retention member can engage behind an edge of a workpiece, but cannot do so in the non-operative position. By means of a drive motor, the retention member moved into the operative position can be moved with a lifting movement along the lifting axis together with the retention member bearing and the transverse guide device which is moved into the operative lifting position.

11 Claims, 3 Drawing Sheets

(51) Int. Cl.
*B21D 43/06* (2006.01)
*B21D 43/10* (2006.01)
*B25J 15/00* (2006.01)
*B25B 5/06* (2006.01)
*B23K 37/02* (2006.01)
*B23K 37/04* (2006.01)
*B23K 37/047* (2006.01)
*B23K 26/08* (2014.01)
*B23K 26/38* (2014.01)

(52) U.S. Cl.
CPC .......... *B23K 26/0869* (2013.01); *B23K 26/38* (2013.01); *B23K 37/0235* (2013.01); *B23K 37/047* (2013.01); *B23K 37/0443* (2013.01); *B25B 5/064* (2013.01); *B25J 15/0047* (2013.01); *B25J 15/0226* (2013.01); *B23K 2201/18* (2013.01)

(58) Field of Classification Search
USPC .................. 72/295, 297, 300; 294/115, 116
See application file for complete search history.

(56) References Cited

FOREIGN PATENT DOCUMENTS

| | | |
|---|---|---|
| DE | 20110628 U1 | 2/2002 |
| EP | 1970139 A1 | 9/2008 |
| GB | 2254598 A | 10/1992 |

* cited by examiner

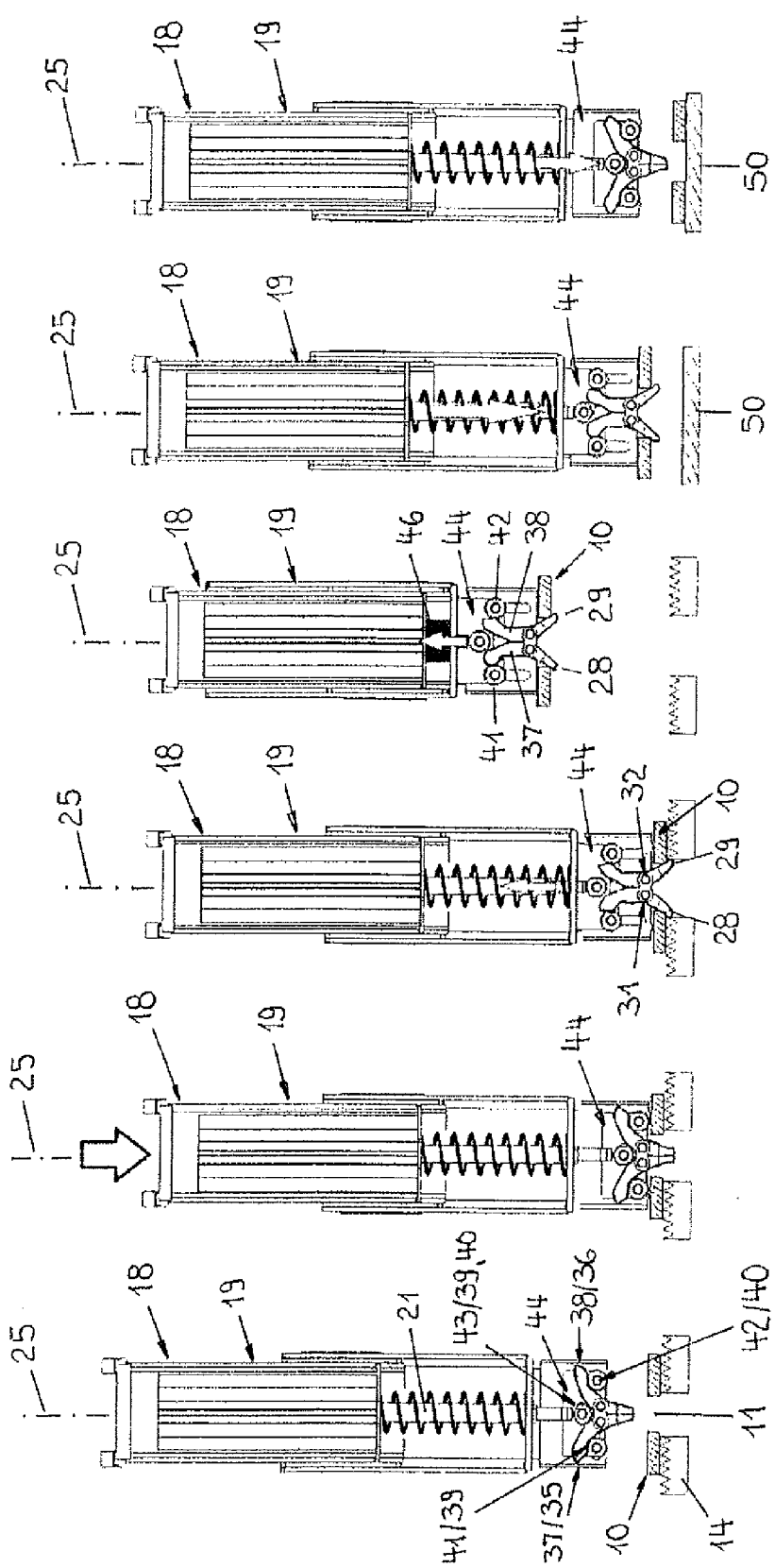

DEVICE FOR HANDLING WORKPIECES, IN PARTICULAR PROCESSING PRODUCTS OF A CUTTING METAL SHEET PROCESSING OPERATION, AND MECHANICAL ARRANGEMENTS HAVING SUCH A DEVICE

CROSS REFERENCE TO RELATED APPLICATION

This application claims priority under 35 U.S.C. §119(a) to German Application No. 10 2012 219 127.5, filed on Oct. 19, 2012, the entire contents of which are incorporated herein by reference.

TECHNICAL FIELD

The invention relates to a device for handling workpieces, in particular workpieces in the form of processing products of a cutting metal sheet processing operation.

BACKGROUND

Prior art of the generic type is known from DE 20110628U1. That publication discloses a transport device having a carrier frame, to which is fitted a device for handling objects to be transported. The device includes a gripping hook that acts as a retention member and that engages behind an object to be transported in an operative position and supports it in the direction of gravitational force. The load acting on the gripping hook is dissipated into the carrier frame by means of a pin that is secured to the carrier frame and that engages in a slot-like opening in the gripping hook. If the gripping hook is in an operative position, an object supported on the gripping hook can be lifted by means of a corresponding movement of the carrier frame with a vertical lifting movement and can be transported away.

The gripping hook can be moved by means of a drive motor in the form of a pneumatic piston/cylinder unit into the operative position, in which it engages behind an object to be transported and also into a non-operative position, in which it is withdrawn relative to an object to be transported. During its movements, the gripping hook is guided by guide devices on the carrier frame of the transport device in such a manner that it describes a curved movement path. The gripping hook driven by the pneumatic piston/cylinder unit pivots with a two-axis movement into the operative position or the non-operative position along the curved movement path, which is produced by means of the mutual superimposition of a vertical and a horizontal gripping hook movement. So that the gripping hook can carry out curved movements into the operative position and the non-operative position, a correspondingly large movement space must be provided.

SUMMARY

The invention relates to devices for handling workpieces, the devices having one or more retention members that are movably supported on a carrier structure by means of a retention member bearing and having a retention member drive that has a drive motor, by means of which the retention member can be moved both with a lifting movement carried out along a lifting axis and with a transverse movement that is carried out in a direction transverse to the lifting axis.

The retention members are guided by means of a transverse guide device to carry out the transverse movement and are able to move on the basis of the guided transverse movement from a non-operative position into an operative position and/or out of an operative position into a non-operative position.

The retention members are arranged to engage behind an edge of a workpiece, e.g., an edge of an opening within the workpiece, in the operative position. The retention members are not able to engage behind an edge of a workpiece in the non-operative position.

In another aspect, the invention further relates to mechanical arrangements that are provided with a device as described herein to supply and/or to discharge workpieces in a machine tool, e.g., to supply and/or discharge processing products in a machine tool for the cutting processing of metal sheets. In addition, the invention also relates to mechanical arrangements for processing workpieces, e.g., for the cutting processing of metal sheets, having a machine tool for the workpiece processing, optionally for the cutting metal sheet processing, and including a mechanical arrangement as described herein for supplying and/or discharging workpieces, by means of which workpieces can be supplied to or discharged from the machine tool.

In another aspect, the invention relates to methods for moving a workpiece from a processing support to a removal support. These methods include obtaining a device as described herein to supply and/or discharge workpieces in the form of processing products; moving a retention member of the device into a location above an opening in a workpiece on a processing support; lowering the retention member to insert the retention member into the opening in the workpiece; operating the device to engage the retention member within the opening of the workpiece; raising the retention member to lift the workpiece off the processing support; moving the device and the attached workpiece into a location above a removal support; lowering the retention member to deposit the workpiece onto the removal support; operating the device to disengage the retention member from the opening of the workpiece; and raising the retention member away from the workpiece, which remains on the removal support.

In these methods the workpieces can be in the form of processing products of a cutting metal sheet processing operation, e.g., in the form of a residual grid of a cutting metal sheet processing operation. In certain embodiments, the retention member can be in the form of a pair of angle grippers.

The new inventions described herein enable the functionally reliable handling of workpieces even under conditions in which the workpieces are present in greatly limited spatial conditions.

According to the invention, the transverse guide device of the retention member can be moved along the lifting axis relative to the retention member by means of the drive motor when the retention member is in the non-operative position and/or when the retention member is in the operative position. The transverse guide device thereby moves along the lifting axis out of a non-operative lifting position associated with the non-operative position of the retention member into an operative lifting position associated with the operative position of the retention member or in the opposite direction out of an operative lifting position into a non-operative lifting position. As a result of the movement of the transverse guide device along the lifting axis, the retention member carries out a transverse movement in the transverse direction of the lifting axis. Due to the transverse movement, the retention member is moved out of the non-operative position into the operative position or out of the operative position into the non-operative position.

The retention member bearing on the associated carrier structure does not change its position during this operation. In particular, the retention member bearing does not move on a movement path that would require a movement space which extends both along the lifting axis and transversely relative thereto. Consequently, an engagement of the retention member behind the workpiece to be handled can be produced by the drive motor in an extremely tight space or such engagement can be released. In order to produce and/or release the engagement behind the relevant workpiece, the retention member bearing does not carry out any two-axis movement, which would be connected with a corresponding spatial requirement and which has a component along the lifting axis and a component that is transverse relative thereto. The movement of the retention member bearing along the lifting axis, which movement is brought about by the drive motor that is also used for the transverse movement of the retention member, is not used in the case of the invention to produce or to release engagement of the retention member behind the workpiece to be handled, but instead is used to move the retention member, which is moved into the operative position, and optionally the workpiece that is engaged behind by the retention member in the operative position, along the lifting axis. The multiple functions of the drive motor of the device according to the invention also contribute to the space-saving conditions in the case of the invention.

On the basis of the particular kinematics of the retention member when producing and releasing an engagement behind a workpiece to be handled, the device according to the invention is particularly suitable for supporting workpieces on the edge of a workpiece opening located inside the workpiece. The retention member in the non-operative position can be moved along the lifting axis by means of an external drive device into a position in which it is introduced into the workpiece opening to such an extent that only the transverse guide device still has to be moved along the lifting axis relative to the retention member to produce the engagement of the retention member behind the edge of the workpiece opening. By means of the movement carried out by the transverse guide device relative to the retention member out of the non-operative lifting position into the operative lifting position, the retention member moves with a transverse movement out of the non-operative position into the operative position without requiring a movement of the retention member bearing for that purpose. Accordingly, an engagement of the retention member produced behind the edge of a workpiece opening inside a workpiece can be released without a change in position of the retention member bearing being necessary therefor.

In certain embodiments, the retention member is secured in the operative position and consequently the engagement of the retention member behind a workpiece to be handled is secured in that the transverse guide device of the retention member, which device is moved into an operative lifting position associated with the operative position of the retention member, blocks the retention member against a return movement into the non-operative position brought about by the retention member being loaded. The workpiece to be handled is secured against undesirable disengagement from the handling device according to the invention by securing the retention member in the operative position. Since the transverse guide device of the retention member also takes on the described securing function, an additional device that would otherwise have to be provided independently for this purpose is superfluous. As a result, the invention provides a structurally simple and compact construction of the general device.

In other embodiments, the retention member once moved into the operative position is secured against return movement into the non-operative position by a particularly simple construction. For this purpose, the retention member and the transverse guide device of the retention member moved into the operative lifting position are supported on each other in a self-locking manner. The self-locking, mutual support of the retention member moved into the operative position and the transverse guide device moved into the operative lifting position prevents the transverse guide device from moving out of the operative lifting position along the lifting axis into the non-operative lifting position simply due to loading of the retention member which may originate, for example, from a workpiece supported on the retention member. Undesirable movement of the retention member out of the operative position into the non-operative position, and consequently undesirable release of the workpiece that the retention member engages behind from the handling device, would be connected with the movement of the transverse guide device into the non-operative lifting position.

In another advantageous embodiment of the invention, there is provision for the retention member to be acted on with force in a direction counter to the movement direction of the transverse guide device during the movement carried out by the transverse guide device of the retention member relative to the retention member along the lifting axis out of the non-operative lifting position into the operative lifting position. The action of force on the retention member ensures that the transverse guide device does not carry the retention member during its movement along the lifting axis and that accordingly the movement of the transverse guide device relative to the retention member, which movement is necessary for switching the retention member from the non-operative position into the operative position, is actually carried out.

In other embodiments, the retention member bearing and the transverse guide device of the retention member are provided on a common carrier structure. The transverse guide device is guided on the common carrier structure in a movable manner along the lifting axis relative to the retention member that is moved into the non-operative position and/or relative to the retention member that is moved into the operative position. In that manner, the retention member, the transverse guide device of the retention member, and the common carrier structure form a compact unit. The drive motor of the retention member drive can move the common carrier structure with the retention member bearing provided thereon and the transverse guide device provided thereon along the lifting axis for the common lifting movement of the retention member moved into the operative position and the transverse guide device moved into the operative lifting position.

The common carrier structure for the retention member and the transverse guide device of the retention member can further afford a possibility of producing the force action on the retention member provided for in a preferred embodiment of the invention in order to ensure the necessary relative movement of the transverse guide device relative to the retention member.

In other embodiments, the drive motor for the retention member drive is constructed as a piston and cylinder unit. This type of construction has been found to be advantageous in practice and can be controlled simply and precisely with regard to its functions.

To minimize the friction of the retention member being guided by the transverse guide device, which moves along the lifting axis, the transverse guide device can comprise or include guide rollers in certain embodiments for guiding the retention member during the transverse movement thereof.

In general, the retention member can be constructed in various ways. For example, it is possible to have a retention member which is moved in the form of a sliding member with a linear transverse movement into the operative position and/or into the non-operative position.

In some embodiments, the retention member comprises or includes a pivot lever that is movably supported on the carrier structure. This pivot lever can be moved into an operative pivot position and/or into a non-operative pivot position by means of the drive motor of the retention member drive via the transverse guide device. Pivotable retention members are distinguished by their ability to move in a manner that involves less friction in relation to retention members that are moved in a linear fashion.

In other embodiments, a first lever arm can form the retention member on a two-armed pivot lever, and the second lever arm can be used to produce the transverse movement of the retention member formed by the first lever arm into the operative position or into the non-operative position. In particular, the second lever arm of the two-armed pivot lever affords a structurally simple, but nevertheless operationally reliable, possibility of supporting the transverse guide device and the first lever arm, which acts as a retention member, on each other in a self-locking manner to prevent undesirable return movement of the first lever arm out of the operative position into the non-operative position.

In another aspect, the devices described herein include two retention members that can be driven in opposite directions in a transverse direction of the lifting axis by means of the drive motor of the retention member drive. Consequently, the devices are particularly suitable for applications in which the workpieces include openings arranged within a portion of the workpiece to enable the retention members to reach into the openings. The two retention members can be moved together by means of opposing transverse movements into their operative position, in which they engage behind the edge of the workpiece opening when they are arranged opposite each other. Accordingly, it is possible to move both retention members together out of the operative position, that is to say, out of the engagement position, into the non-operative position in which the previously existing engagement is released. Each of the two retention members has a transverse guide device that is moved along the lifting axis to produce the transverse movement of the associated retention member. For the sake of simplicity, the two transverse guide devices can be connected to each other for common movement along the lifting axis.

The invention is explained in greater detail below with reference to schematic drawings of examples of different embodiments.

BRIEF DESCRIPTION OF THE DRAWINGS

FIGS. 3 to 8 are illustrations that show the operation of the gripper arrangement of FIG. 2.

FIG. 3 shows the gripper arrangement arranged above an opening of a residual grid produced during previous metal sheet processing, with angle grippers of the gripper arrangement being in non-operative pivot positions.

FIG. 4 shows the gripper arrangement in a ready-to-receive position with the angle grippers arranged inside the residual grid opening and still being in non-operative pivot positions.

FIG. 5 shows the gripper arrangement with the angle grippers inside the residual grid opening being in operative pivot positions, the angle grippers thus engaging behind the edge of the residual grid opening.

FIG. 6 shows the gripper arrangement with the angle grippers and the residual grid retained thereon lifted relative to a support of the residual grid.

FIG. 7 shows the gripper arrangement with the angle grippers and the residual grid retained thereon lowered towards a residual grid pallet.

FIG. 8 shows the gripper arrangement with the angle grippers being in non-operative pivot positions and the residual grid released from the angle grippers resting on the residual grid pallet.

DETAILED DESCRIPTION

Figure 1:
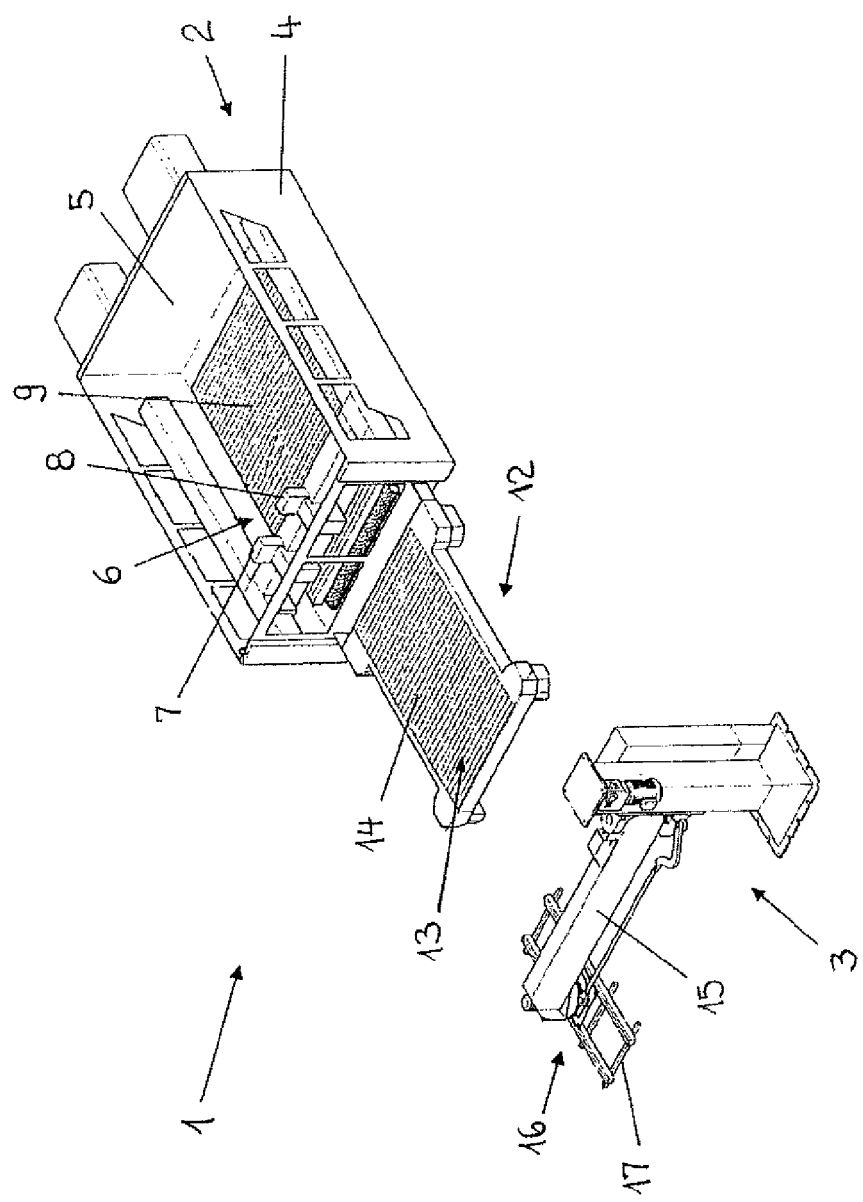
FIG. 1 is a schematic that shows a mechanical arrangement for processing metal sheets. The arrangement includes a laser cutting machine and a handling device for discharging processing products from the laser cutting machine.

FIG. 1 shows a mechanical arrangement 1 for processing sheet metal that comprises as a machine tool a laser cutting machine 2 and, furthermore, a handling device 3 that can be used as a mechanical arrangement for supplying and discharging workpieces in the laser cutting machine 2, but which is merely used in the example illustrated in FIG. 1 to discharge processing products from the laser cutting machine 2. The laser cutting machine 2 has an operating region 5 delimited by a housing 4. A cutting unit 6 having laser cutting heads 7, 8 travels in conventional manner in a horizontal movement plane in this operating region 5 over a workpiece support 9.

A metal sheet that is intended to be processed is supplied to the operating region 5 of the laser cutting machine 2 as an unprocessed sheet metal blank, which is not illustrated for the sake of clarity in FIG. 1. Finished components are produced from the metal sheet as processing products by means of the laser cutting heads 7, 8 of the cutting unit 6 and a residual grid 10 indicated in FIGS. 3 to 8 is produced. At the end of or during the actual production operations, the laser cutting heads 7, 8 further provide the residual grid 10 with workpiece openings or residual grid openings 11.

The sheet metal blanks are supplied to the operating region 5 of the laser cutting machine 2 from a pallet changer 12, which is arranged in front of the laser cutting machine 2. The unprocessed metal sheet is deposited on a processing support, e.g., in the form of a support grate of a pallet 13 on the pallet changer 12. In conventional manner, the support grate of the pallet 13 is formed by a plurality of processing support strips 14 that extend in parallel with each other with mutual spacing and that support both a sheet metal blank to be processed and the processing products, in particular the residual grid 10, on tips.

Together with the pallet 13, an unprocessed metal sheet is transferred from the pallet changer 12 into the operating region 5 of the laser cutting machine 2 to be processed by cutting. At the end of the cutting processing, the pallet 13 is moved back to the pallet changer 12 with the finished components now present along with the residual grid 10.

In the example illustrated, the finished components are manually removed from the pallet 13 arranged on the pallet changer 12. By means of the handling device 3 the residual grid 10 is separated from the finished components and subsequently discharged from the pallet 13.

The handling device 3 has a horizontally pivotable extension arm 15, on which a handling unit 16 is suspended. The handling unit 16 has a substantially rectangular carrier frame 17, which is pivotably movable about a vertical axis relative to the extension arm 15 and which can further be raised and lowered in a vertical direction.

A plurality of structurally identical gripper arrangements 18, which are concealed in FIG. 1 by the carrier frame 17, are fitted to the lower side of the carrier frame 17 of the handling unit 3. The gripper arrangements 18 act as devices for handling the residual grid 10. One of the gripper arrangements 18 is shown in detail in FIG. 2.

Figure 2:
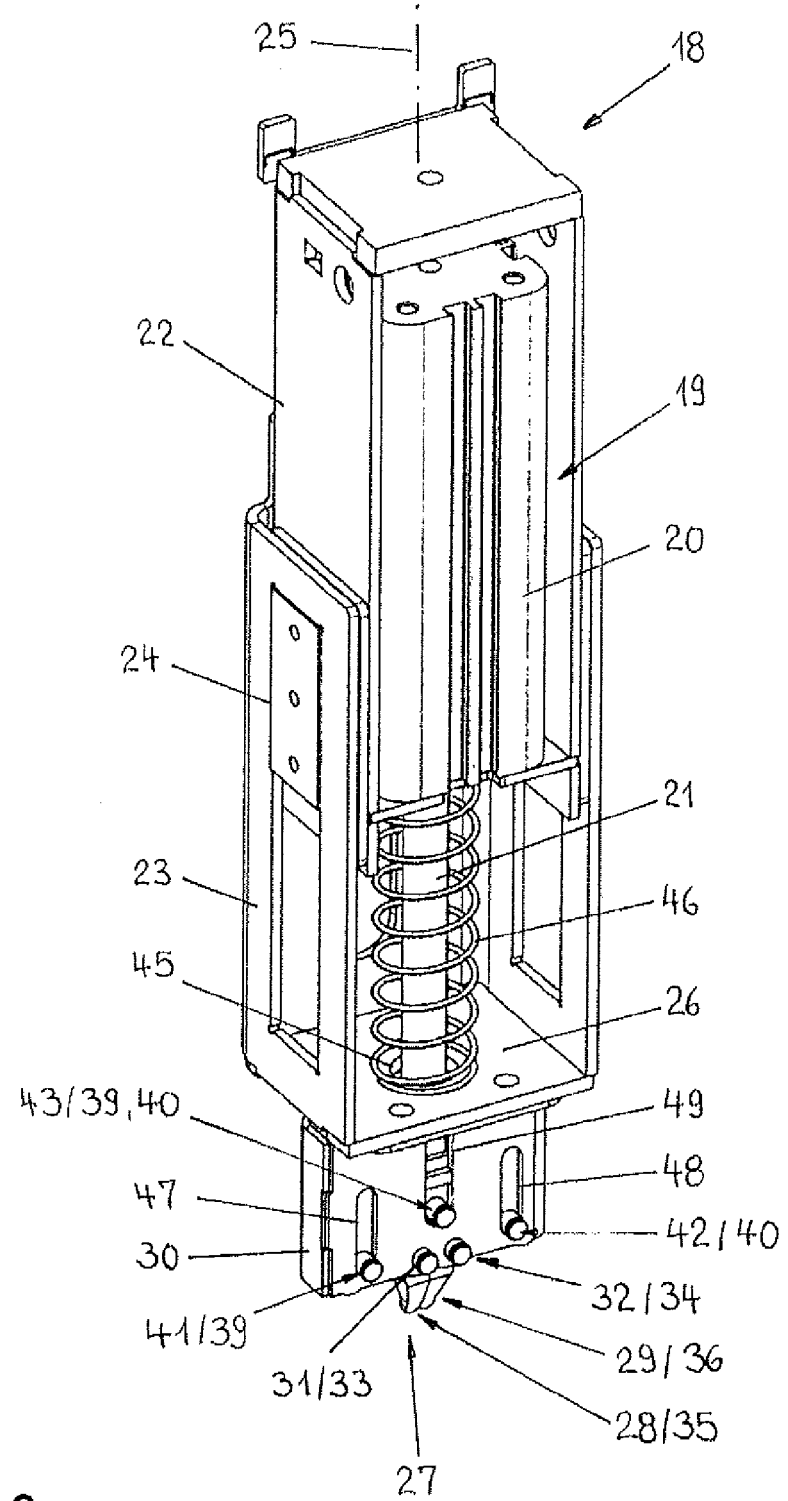
FIG. 2 is a schematic that shows a gripper arrangement provided on the handling device according to FIG. 1 to handle processing products.

According to FIG. 2, each of the gripper arrangements 18 has, in some embodiments, as a drive motor of a retention member drive, a piston/cylinder unit 19 that comprises as motor components a cylinder 20 and a piston that is guided in the cylinder interior (which cannot be seen in FIG. 2). A piston rod 21 that extends downwards out of the cylinder 20 is fitted to the piston of the piston/cylinder unit 19.

A motor housing 22 of the gripper arrangement 18 receives the cylinder 20 of the piston/cylinder unit 19 and is rigidly screwed to the carrier frame 17 of the handling device 3. A lifting guide housing 23 is arranged on the motor housing 22. The lifting guide housing 23 is guided so as to be movable along a vertical lifting axis 25 on the motor housing 22 by means of a slideway 24.

A gripper unit 27 is mounted on the lower side of a base 26 of the lifting guide housing 23. The gripper unit 27 comprises angle grippers 28, 29 that act as retention members and that project down along the lifting axis 25 out of a downwardly open gripper housing 30 of the gripper unit 27. The gripper housing 30 is screwed at the upper side thereof to the base 26 of the lifting guide housing 23.

The angle gripper 28 is supported on the gripper housing 30 so as to be pivotable about a horizontal axis by means of a retention member bearing in the form of a pivot bearing 31 and the angle gripper 29 is supported on the gripper housing 30 so as to be pivotable about a horizontal axis by means of a retention member bearing in the form of a pivot bearing 32. The horizontal pivot axes of the angle grippers 28, 29 are defined by bearing journals 33, 34 that extend through associated bearing eyelets on the gripper housing 30 and first ends of which can be seen in FIG. 2. Together with the bearing eyelets on the gripper housing 30, the bearing journals 33, 34 form the pivot bearings 31, 32 of the angle grippers 28, 29.

As shown in the embodiments illustrated in FIGS. 3 to 8, the angle gripper 28 is formed by a first lever arm of a two-armed pivot lever 35 and the angle gripper 29 is formed by a first lever arm of a two-armed pivot lever 36. The two-armed pivot lever 35 has, in addition to the angle gripper 28, a second lever arm 37 that is angled relative thereto. The two-armed pivot lever 36 accordingly has a second lever arm 38, which is angled relative to the angle gripper 29.

The series of FIGS. 3 to 8 also illustrate the operation steps or states of the new devices in use to move a workpiece, e.g., in the form of a residual grid 10 from a processing support, e.g., in the form of processing support strips 14, to a removal support, e.g., in the form of a residual grid pallet 50.

A transverse guide device 39 acts on the angle gripper device 28 via the second lever arm 37. A transverse guide device 40 acts on the angle gripper 29 via the second lever arm 38.

The transverse guide device 39 includes a guide roller 41 and the transverse guide device 40 includes a guide roller 42. A guide roller 43 is common to the transverse guide devices 39, 40. All the guide rollers 41, 42, 43 are supported rotatably about a horizontal roller axis on a common guide sliding member 44 of the transverse guide devices 39, 40, respectively.

The common guide sliding member 44 received inside the gripper housing 30 is connected to the piston rod 21 of the piston/cylinder unit 19, which extends for this purpose through the base 26 of the lifting guide housing 23 at a passage 45 (see FIG. 2). A compression spring 46, which is pre-tensioned between the base 26 of the lifting guide housing 23 and the lower side of the motor housing 22, is arranged on the piston rod 21 above the base 26 of the lifting guide housing 23.

The guide rollers 41, 42, 43, which are supported on the common guide sliding member 44 of the transverse guide devices 39, 40, are guided on the gripper housing 30 in guiding slots 47, 48, 49, which extend in parallel to the lifting axis 25 with a width that is somewhat larger than the diameter of the guide rollers 41, 42, 43. Since the pivot bearings 31, 32 of the angle grippers 28, 29 are also provided on the gripper housing 30, the gripper housing 30 forms a common carrier structure for the pivot bearings 31, 32 or the angle grippers 28, 29 and the transverse guiding devices 39, 40.

If the processing of a metal sheet on the laser cutting machine 2 is finished and if the finished components produced and the residual grid 10 are transferred with the pallet 13 to the pallet changer 12, the handling unit 16 of the handling device 3 is moved by the extension arm 15 being pivoted above the pallet 13 located on the pallet changer 12. The carrier frame 17 of the handling unit 16 is positioned in such a manner that the gripper arrangements 18 mounted on the carrier frame 17 each come to rest above one of the residual grid openings 11 in the residual grid 10 supported on the pallet 13. This results in the relationships illustrated in FIG. 3 for one of the gripper arrangements 18. The operating state of the gripper arrangement 18 in FIG. 3 corresponds to the operating state of the gripper arrangement 18 according to FIG. 2.

When the piston/cylinder unit 19 is actuated accordingly, the common guide sliding member 44 of the transverse guide devices 39, 40, including the guide rollers 41, 42, 43, wherein the guide sliding member 44 (see FIGS. 3 to 8) is connected to the piston rod 21, is moved inside the gripper housing 30 along the lifting axis 25 into the lower end position. As a result, the transverse guide devices 39, 40 take up a non-operative lifting position along the lifting axis 25. A non-operative pivot position of the angle grippers 28, 29 is associated with the non-operative lifting position of the transverse guiding devices 39, 40. The common guide roller 43 of the transverse guide devices 39, 40, which guide roller 43 is fitted to the common guide sliding member 44, acts on both the second lever arm 37 of the two-armed pivot lever 35 and the second lever arm 38 of the two-armed pivot lever 36 with a force that is directed downwards along the lifting axis 25. The angle grippers 28, 29 on the two-armed pivot levers 35, 36 are moved towards each other in the non-operative pivot position and consequently have, transversely relative to the lifting axis 25, a dimension that is smaller than the width of the associated residual grid opening 11 in the residual grid 10. As a result of the second lever arms 37, 38 of the two-armed pivot levers 35, 36 being acted on by the common guide roller 43 of the transverse guide devices 39, 40, the angle grippers 28, 29 are securely retained in the respective non-operative pivot position.

The pre-tensioned compression spring 46 on the piston rod 21 urges the lifting guide housing 23 and the gripper housing 30 fitted thereto into the lower end position relative to the motor housing 22. In the region of the slide guide 24, the lifting guide housing 23 is supported with a stop on an abutment provided on the motor housing 22 in a downward direction (FIG. 2).

In this operating state, the gripper arrangements 18 are lowered by the carrier frame 17 of the handling device 3 in the direction towards the residual grid 10 supported by the pallet 13 until the gripper housing 30 contacts with its lower side the residual grid 10 or is spaced only slightly from the upper side of the residual grid 10. The gripper arrangement 18 is now in a ready-to-receive position. The angle grippers 28, 29 have been introduced into the residual grid opening 11 associated therewith. The transverse guide devices 39, 40 inside the gripper housing 30 are still in the non-operative lifting position. The angle grippers 28, 29 inside the associated residual grid opening 11 accordingly further take up their non-operative pivot position (FIG. 4).

To move the angle grippers 28, 29 from the non-operative pivot position into the operative pivot position, the piston rod 21 is moved upwards along the lifting axis 25 together with the transverse guide devices 39, 40 fitted thereto by the piston/cylinder unit 19 being actuated. The pivot bearings 31, 32 of the angle grippers 28, 29 do not change their position at first. Instead, the pivot bearings 31, 32 remain in their lower end position in relation to the motor housing 22, and consequently also in relation to the carrier frame 17 of the handling device 3, as a result of the action by the compression spring 46 acting via the lifting guide housing 23 and the gripper housing 30 on the pivot bearings 31, 32 in the opposite direction to the movement direction of the transverse guide devices 39, 40 and under the action of the inherent weight of the structural unit that comprises the lifting guide housing 23 and the gripper unit 27.

Consequently, a linear movement of the transverse guide devices 39, 40 connected to the piston rod 21 of the piston/cylinder unit 19 occurs along the lifting axis 25 relative to the angle grippers 28, 29. That relative movement is converted into a pivot movement of the angle grippers 28, 29 by means of the second lever arms 37, 38 of the two-armed pivot levers 35, 36, which arms 37, 38 are acted on by the guide rollers 41, 42 of the transverse guide devices 39, 40. The guide rollers 41, 42 of the transverse guide devices 39, 40 roll on the second lever arms 37, 38 of the two-armed pivot levers 35, 36.

The angle grippers 28, 29 pivot with opposing transverse movements in the transverse direction of the lifting axis 25 out of the non-operative pivot position according to FIGS. 2 to 4 into the operative pivot position according to FIG. 5 as a result of the second lever arms 37, 38 of the two-armed pivot levers 35, 36 being acted on by the guide rollers 41, 42 of the transverse guide devices 39, 40, which guide rollers 41, 42 are displaced upwards along the lifting axis 25. In the operative pivot position, the angle grippers 28, 29 engage behind the edge of the associated residual grid opening 11 at mutually opposite sides. The transverse guide devices 39, 40 inside the gripper housing 30 take up their operative lifting position associated with the operative pivot position of the angle grippers 28, 29.

The transverse guide devices 39, 40 abut the lower side of the base 26 of the lifting guide housing 23 with the common guide sliding member 44 with the production of the engagement of the angle grippers 28, 29 behind the edge of the associated residual grid opening 11 and when the transverse guide devices 39, 40 reach the operative lifting position.

Until this time, the action of the gripper housing 30 brought about by means of the compression spring 46 in a direction opposite to the upward movement carried out along the lifting axis 25 by the transverse guide devices 39, 40 has caused the gripper housing 30 and the angle grippers 28, 29 supported thereon to retain their position taken up along the lifting axis 25 relative to the motor housing 22 and the carrier frame 17 of the handling device 3, irrespective of the upward movement of the transverse guide devices 39, 40.

This changes as soon as the transverse guide devices 39, 40 abut the base 26 of the lifting guide housing 23 during their upward movement with the common guide sliding member 44. Thereafter, an upward movement produced by means of the piston/cylinder unit 19 results in the transverse guide devices 39, 40, which are moved into the operative lifting position relative to the angle grippers 28, 29, or the pivot bearings 31, 32 thereof carrying out a lifting movement that is directed upwards along the lifting axis 25 together with the angle grippers 28, 29 located in the operative pivot position relative to the motor housing 22 and the carrier frame 17 of the handling device 3. As a result of that lifting movement, the residual grid 10 behind which the angle grippers 28, 29 engage is lifted off the pallet 13 and thereby separated from the finished components of the sheet metal processing operation, which finished components remain on the pallet 13 and are not illustrated for the sake of simplicity. The compression spring 46 is compressed between the lifting guide housing 23 and the motor housing 22 (FIG. 6).

The residual grid 10 is now supported on the angle grippers 28, 29 of the different gripper arrangements 18 of the handling device 3, which angle grippers 28, 29 are moved into the operative pivot position.

The angle grippers 28, 29 that are moved into the operative pivot position and that are loaded by the residual grid 10 in the direction of gravitational force are then secured to prevent an undesirable return into the non-operative pivot position. The anti-return securing action is brought about by the transverse guide devices 39, 40 of the angle grippers 28, 29 being moved into the operative lifting position.

As can be seen in FIG. 6, the transverse guide devices 39, 40 and the two-armed pivot levers 35, 36 are structurally adapted to each other in such a manner that the guide rollers 41, 42 of the transverse guide devices 39, 40 moved into the operative lifting position are opposite the free ends of the second lever arms 37, 38 of the two-armed pivot levers 35, 36 perpendicularly relative to the lifting axis 25 when the angle grippers 28, 29 take up the operative pivot position. The second lever arms 37, 38 of the two-armed pivot levers 35, 36 are supported on the guide rollers 41, 42 of the transverse guide devices 39, 40 with an application line that extends perpendicularly relative to the lifting axis 25 as a result of the angle grippers 28, 29 being loaded in the direction of gravitational force by the residual grid 10.

In the operating state according to FIG. 6, the gripper arrangements 18 with the residual grid 10 that is retained thereon and is lifted off the pallet 13 are moved away from the pallet 13 by a corresponding pivot movement of the extension arm 15 of the handling device 3. The pivot movement of the extension arm 15 with the residual grid 10 ends as soon as the residual grid 10 comes to rest above a removal support, e.g., in the form of a residual grid pallet 50, which is indicated in FIGS. 7 and 8. As a result, the gripper arrangements 18 are in a ready-for-discharge position.

The piston/cylinder unit 19 of the individual gripper arrangements 18 is now switched to a pressure-free state and, under the action of the weight of the residual grid 10, and with support from the relaxing compression spring 46, the gripper housing 30 moves downwards along the lifting axis 25 with the transverse guide devices 39, 40, which are still in the operative lifting position relative to the pivot bearings 31, 32, and the angle grippers 28, 29, which are further moved into the operative pivot position.

Due to the horizontal extent of the application line of the mutual support of the second lever arms 37, 38 of the two-armed pivot levers 35, 36, on the one hand, and the guide rollers 41, 42 of the transverse guide devices 39, 40, on the other hand, the forces exerted by the two-armed pivot levers 35, 36 to the guide rollers 41, 42 do not urge the transverse guide devices 39, 40 to move out of the operative lifting position downwards into the non-operative lifting position as a result of the loading, which acts on the angle grippers 28, 29 in the direction of gravitational force. However, the two-armed pivot levers 35, 36 would be released for a pivot movement, during which the angle grippers 28, 29 could move out of the operative pivot position into the non-operative pivot position, only by means of such a downward movement of the transverse guide devices 39, 40.

During the downward movement of the gripper housing 30, the mutual support of the guide rollers 41, 42 of the transverse guide devices 39, 40, on the one hand, and the second lever arms 37, 38 of the two-armed pivot levers 35, 36, on the other hand, is maintained, which support is self-locking counter to the angle grippers 28, 29 being returned into the non-operative pivot position. Consequently, the gripper housing 30 is lowered with the residual grid 10 retained thereon until the stop on the lifting guide housing 23 contacts the abutment on the motor housing 22 on the slideway 24. The residual grid 10 thereby comes to rest with slight spacing from the upper side of the residual grid pallet 50 (FIG. 7).

The angle grippers 28, 29 that are moved into the operative pivot position are still blocked by the transverse guide devices 39, 40, which are moved into the operative lifting position to prevent automatic return movement under the action of the weight of the residual grid 10. Consequently, the residual grid 10 continues to be securely fixed to the gripper arrangements 18 of the handling device 3.

It is also conceivable to actuate the piston/cylinder unit 19 to lower the gripper housing 30 out of the position according to FIG. 6 into the position according to FIG. 7. However, a relative movement of the transverse guide devices 39, 40 connected to the piston rod 21 in relation to the two-armed pivot levers 35, 36 must not occur inside the gripper housing 30. Such a relative movement would at least endanger the maintenance of the operative pivot position of the angle grippers 28, 29.

To disengage the residual grid 10 from the gripper arrangements 18, the piston/cylinder unit 19 of each gripper arrangement 18 is actuated and the piston rod 21 of the gripper arrangements 18 is moved downwards along the lifting axis 25. The downward movement of the piston rod 21 is connected with a corresponding movement of the transverse guide devices 39, 40 relative to the angle grippers 28, 29 or relative to the pivot bearings 31, 32 of the angle grippers 28, 29. When the second lever arms 37, 38 are positioned on the guide rollers 41, 42 of the transverse guide devices 39, 40 after a small portion of the downward movement of the transverse guide devices 39, 40, the second lever arms 37, 38 of the two-armed pivot levers 35, 36 are acted on by the transverse guide devices 39, 40, specifically by the common guide roller 43 thereof, and expanded with opposing transverse movements transversely relative to the lifting axis 25. Opposing transverse movements of the angle grippers 28, 29, as a result of which the angle grippers 28, 29 move from the operative pivot position into the non-operative pivot position, are associated therewith. The previously existing engagement of the angle grippers 28, 29 behind the edge of the associated residual grid opening 11 is released and the residual grid 10 is deposited on the residual grid pallet 50 under the action of gravitational force (FIG. 8). The gripper arrangements 18 of the handling device 3 are again in the operating state as shown in FIGS. 2 and 3.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A device for handling workpieces, comprising:
a carrier structure;
a pair of two-armed pivot levers, each comprising a first lever arm and a second lever arm arranged at an angle relative to the first lever arm, wherein each first lever arm forms a retention member;
two retention member bearings, each of which is formed by a pivot bearing and each of which movably supports one of the first lever arms on the carrier structure such that the first lever arm can be pivoted from a non-operative pivot position into an operative pivot position and vice versa;
a retention member drive including a drive motor; and
two retention member transverse guide devices, each of which is arranged to guide a respective one of the first lever arms; wherein
the drive motor is configured to move the retention member transverse guide devices relative to the first lever arms and the pivot bearings with a lifting movement along a lifting axis, wherein the retention member transverse guide devices are moved into an operative lifting position or into a non-operative lifting position;
the retention member transverse guide devices are configured to guide the first lever arms movably supported by the pivot bearings, to carry out, due to the lifting movement of the retention member transverse guide devices into the operative lifting position or into the non-operative lifting position, a transverse movement in a direction transverse to the lifting axis, the first lever arms thus being pivoted into the operative pivot position associated with the operative lifting position of the retention member transverse guide devices or into the non-operative pivot position associated with the non-operative lifting position of the retention member transverse guide devices, wherein the first lever arms in the operative pivot position can engage behind an edge of a workpiece whereas the first lever arms in the non-operative pivot position cannot engage behind an edge of a workpiece,
each of the retention member transverse guide devices includes a guide roller to guide the associated first lever arm during the transverse movement thereof and the retention member transverse guide devices further have a common guide roller, the guide rollers of the retention member transverse guide devices and the common guide roller being rotatably supported on a common guide sliding member of the transverse guide devices, wherein the guide rollers of the retention member transverse guide devices are configured to act upon the second lever arms when the retention member transverse guide devices perform the lifting movement into the operative lifting position and, thus, to pivot the first lever arms out of the non-operative pivot position into the operative pivot position and wherein the common guide roller is configured to act upon the second lever arms when the retention member transverse guide devices perform the lifting movement into the non-operative lifting position and, thus, to pivot the first lever arms out of the operative pivot position into the non-operative pivot position, and the drive motor is further configured to move the pivot bearings together with the first lever arms, which are pivoted into the operative pivot position, and the retention member transverse guide devices, which are moved into the operative lifting position, with a lifting movement along the lifting axis.

2. The device of claim 1, wherein the device for handling workpieces is arranged to handle workpieces in the form of processing products of a metal sheet cutting operation.

3. The device according to claim 1, wherein the retention member transverse guide devices that are moved into the operative lifting position are configured to block the first lever arms moved into the operative pivot position against a return movement into the non-operative pivot position.

4. The device according to claim 3, wherein the first lever arms moved into the operative pivot position are blocked by the retention member transverse guide devices that are moved into the operative lifting position, as a result of a self-locking mutual support of the first lever arms and the retention member transverse guide devices counter to a return movement of the first lever arms into the non-operative pivot position.

5. The device according to claim 1, wherein during the lifting movement of the retention member transverse guide devices into the operative lifting position the first lever arms are acted on with a force in a direction counter to the direction of the lifting movement of the retention member transverse guide devices.

6. The device according to claim 1, wherein the pivot bearings and the retention member transverse guide devices are provided on a common carrier structure, wherein the retention member transverse guide devices are guided on the common carrier structure thus being movable relative to the first lever arms with the lifting movement along the lifting axis, and wherein the drive motor is configured to move the common carrier structure along the lifting axis, wherein the drive motor is configured to move the pivot bearings together with the first lever arms, which are moved into the operative pivot position, and the retention member transverse guide devices, which are moved into the operative lifting position, with a lifting movement along the lifting axis.

7. The device according to claim 6, wherein the pivot bearings provided on the common carrier structure are in a fixed position in the direction of the lifting axis relative to the common carrier structure and wherein during the lifting movement of the retention member transverse guide devices into the operative lifting position the first lever arms are acted on via the common carrier structure with a force in a direction counter to the direction of the lifting movement of the retention member transverse guide devices.

8. The device according to claim 1, wherein the drive motor comprises a piston/cylinder unit that includes a piston and a cylinder that can move relative to each other along the lifting axis, and wherein the retention member transverse guide devices are connected to either the piston or the cylinder.

9. The device according to claim 1, wherein the retention member transverse guide devices are configured to guide the first lever arms movably supported by the pivot bearings, to carry out, due to the lifting movement of the retention member transverse guide devices into the operative lifting position or into the non-operative lifting position, transverse movements in opposite directions transverse to the lifting axis.

10. A mechanical arrangement for supplying, discharging, or supplying and discharging workpieces in a machine tool having a movable carrier frame on which a device of claim 1 for handling workpieces is provided, wherein the device for handling workpieces is movable by means of the carrier frame into a ready-to-receive position, in which the first lever arms of the device for handling workpieces that are moved into a non-operative pivot position can be moved into an operative pivot position to fix a workpiece or the device for handling workpieces is movable by means of the carrier frame into a ready-for-discharge position, in which the first lever arms of the device for handling workpieces, that are moved into an operative pivot position, can be moved into a non-operative pivot position to release a workpiece.

11. A mechanical arrangement for processing workpieces, comprising a machine tool for the workpiece processing and comprising a mechanical arrangement of claim 10 for supplying, discharging, or supplying and discharging workpieces, by means of which workpieces can be supplied to the machine tool and by means of which workpieces can be discharged from the machine tool.

* * * * *